United States Patent
Yang et al.

(10) Patent No.: US 10,387,193 B2
(45) Date of Patent: Aug. 20, 2019

(54) METHOD FOR IDENTIFYING APPLICATION CAUSING TEMPERATURE RISE OF TERMINAL, AND TERMINAL

(71) Applicant: BEIJING KINGSOFT INTERNET SECURITY SOFTWARE CO., LTD., Beijing (CN)

(72) Inventors: Haiying Yang, Beijing (CN); Jialin Xiong, Beijing (CN); Kangzong Zhang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 230 days.

(21) Appl. No.: 15/503,595

(22) PCT Filed: Aug. 14, 2015

(86) PCT No.: PCT/CN2015/087035
§ 371 (c)(1),
(2) Date: Feb. 13, 2017

(87) PCT Pub. No.: WO2016/023520
PCT Pub. Date: Feb. 18, 2016

(65) Prior Publication Data
US 2017/0235598 A1   Aug. 17, 2017

(30) Foreign Application Priority Data

Aug. 14, 2014 (CN) .......................... 2014 1 0400632
Aug. 14, 2014 (CN) .......................... 2014 1 0400878
Aug. 14, 2014 (CN) .......................... 2014 1 0400879

(51) Int. Cl.
*G06F 9/48* (2006.01)
*G06F 9/50* (2006.01)
*G06F 11/30* (2006.01)

(52) U.S. Cl.
CPC .......... *G06F 9/4806* (2013.01); *G06F 9/5094* (2013.01); *G06F 11/3013* (2013.01); *G06F 11/3058* (2013.01); *G06F 11/3065* (2013.01)

(58) Field of Classification Search
None
See application file for complete search history.

(56) References Cited

U.S. PATENT DOCUMENTS 5,744,937 A * 4/1998 Cheon .................. H02J 7/0006
                                                    320/106
2007/0268953 A1 * 11/2007 Price ........................ G01J 5/16
                                                    374/1
(Continued)

FOREIGN PATENT DOCUMENTS

CN   102141942 A    8/2011
CN   103019842 A    4/2013
(Continued)

OTHER PUBLICATIONS

English translation of the International Search Report dated Oct. 12, 2015 for corresponding International Application No. PCT/CN2015/087035, filed Aug. 14, 2015.
(Continued)

*Primary Examiner* — Chat C Do
*Assistant Examiner* — William C Wood
(74) *Attorney, Agent, or Firm* — David D. Brush; Westman, Champlin & Koehler, P.A.

(57) ABSTRACT

A method for identifying an application causing a temperature rise of a terminal, and a terminal are provided. The method includes: obtaining a value range of temperature of a current component of the terminal during operation of a current application; calculating a ratio of a difference between the value range and a normal value range of the temperature of the current component when the terminal is in an idle state in the environment to the normal value range;
(Continued)

and if the ratio is greater than a preset threshold, determining that the current application is the application causing the temperature rise of the terminal. The method accurately identifies the APP causing the temperature rise, so that the user may be reminded to process the APP when the APP causing the temperature rise of the terminal is determined, so as to reduce the effect on the terminal of the APP.

17 Claims, 5 Drawing Sheets

(56) References Cited

U.S. PATENT DOCUMENTS

| | | | | |
|---|---|---|---|---|
| 2011/0119299 | A1* | 5/2011 | Fra | H04M 1/72577 707/769 |
| 2014/0215497 | A1* | 7/2014 | Guo | H04W 52/0264 719/320 |
| 2014/0266404 | A1* | 9/2014 | Jang | G06F 11/3058 327/509 |

FOREIGN PATENT DOCUMENTS

| | | |
|---|---|---|
| CN | 104199727 A | 12/2014 |
| CN | 104199759 A | 12/2014 |
| CN | 104199765 A | 12/2014 |

OTHER PUBLICATIONS

Written Opinion of the International Searching Authority dated Oct. 12, 2015 for corresponding International Application No. PCT/CN2015/087035, filed Aug. 14, 2015.
Chinese Office Action dated Aug. 1, 2016 for Chinese Application No. 201410400632.7, filed Aug. 14, 2014.
English Translation of Chinese Office Action dated Aug. 1, 2016 for Chinese Application No. 201410400632.7, filed Aug. 14, 2014.
Chinese Office Action dated Aug. 5, 2017 for Chinese Application No. 201410400632.7, filed Aug. 14, 2014.
English Translation of Chinese Office Action dated Aug. 5, 2017 for Chinese Application No. 201410400632.7, filed Aug. 14, 2014.
Zhenxiangxia, "Will Temperature Affect Performance and Stability of CPU?", pp. 10-15 of text, published on Aug. 4, 2013, retrieved from PConline.com.cn.
"A Slight Correlation Between Disk Temperature and Hard Disk Failure Rate", p. 1 of text, published on May 12, 2014, retrieved from http://www.cnbeta.com/articles/tech/291187.htm.
English Translation of the Written Opinion of the International Searching Authority dated Oct. 12, 2015 for corresponding International Application No. PCT/CN2015/087035, filed Aug. 14, 2015.

* cited by examiner

Fig. 6

METHOD FOR IDENTIFYING APPLICATION CAUSING TEMPERATURE RISE OF TERMINAL, AND TERMINAL

CROSS REFERENCE TO RELATED APPLICATIONS

This application is a U.S. national phase application based on International Application No. PCT/CN2015/087035, filed Aug. 14, 2015, published as WO2016/023520 A1 on Feb. 18, 2016, not in English, which claims priority to and benefits of Chinese Patent Application No. 201410400632.7, which is entitled as "Method and apparatus for obtaining normal value range of temperature of terminal component, and terminal", Chinese Patent Application No. 201410400879.9, which is entitled as "Method and apparatus for identifying application causing temperature rise of terminal, and terminal", and Chinese Patent Application No. 201410400878.4, which is entitled as "Method and apparatus for reducing terminal temperature, and terminal", which were filed with State Intellectual Property Office on Aug. 14, 2014, the entire contents of which are incorporated herein by reference.

FIELD

The present disclosure relates to terminal technology field, and more particularly to a method and an apparatus for identifying an application causing a temperature rise of a terminal, and a terminal.

BACKGROUND

Currently, an instantaneous value of temperature for each component in a terminal may be obtained by reading an interface of a terminal system, for example, if the terminal is a smart phone, the instantaneous values of the temperature of components (such as a central processing unit (CPU for short), a display card, a sound card and the like in the smart phone) may be obtained by reading an system interface of the smart phone.

Generally, an application (APP for short) installed in the terminal may cause temperature changes of the components of the terminal during operation thereof, thus causing a temperature change of the terminal. In the related art, only the instantaneous value of the temperature of the component of the terminal is provided, and normal value ranges of the temperature of the component of the terminal in different scenes are not provided, such that the APP causing a temperature rise of the terminal may not be identified according to the normal value range of the component of the terminal. The APP causing the temperature rise of the terminal will generally occupy a large amount of resources of the terminal, which will not only cause the temperature rise, but also affect the operation efficiency of the terminal, and the user experience is poor.

SUMMARY

Embodiments of the present disclosure provide a method for identifying an application causing a temperature rise of a terminal, including: in an environment where the terminal is located, obtaining a value range of temperature of a current component of the terminal during operation of a current APP; and calculating a ratio of a difference between the value range and a normal value range of the temperature of the current component when the terminal is in an idle state in the environment to the normal value range of the temperature of the current component when the terminal is in the idle state in the environment, and if the ratio is greater than a preset threshold, determining that the current APP is the APP causing the temperature rise of the terminal.

Embodiments of the present disclosure provide a mobile terminal, including: a shell, a processor, a memory, a circuit board and a power supply circuit, in which, the circuit board is disposed in an interior space surrounded by the shell, the processor and the memory are disposed on the circuit board; the power supply circuit is configured to supply electricity for each circuit or element of the mobile terminal; the memory is configured to store executable program codes; and the processor is configured to run a program corresponding to the executable program codes by reading the executable program codes stored in the memory, so as to execute following acts: obtaining a value range of temperature of a current component of the terminal during operation of a current APP in an environment where the terminal is located; and calculating a ratio of a difference between the value range and a normal value range of the temperature of the current component when the terminal is in an idle state in the environment to the normal value range of the temperature of the current component when the terminal is in the idle state in the environment, and if the ratio is greater than a preset threshold, determining that the current APP is the APP causing the temperature rise of the terminal.

Embodiments of the present disclosure provide a non-transitory computer storage medium. The storage medium is configured to store an application for performing the method for identifying an application causing a temperature rise of a terminal, in which the method includes: in an environment where the terminal is located, obtaining a value range of temperature of a current component of the terminal during operation of a current application; calculating a ratio of a difference between the value range and a normal value range of the temperature of the current component when the terminal is in an idle state in the environment to the normal value range of the temperature of the current component when the terminal is in the idle state in the environment; and if the ratio is greater than a preset threshold, determining that the current application is the application causing the temperature rise of the terminal.

Additional aspects and advantages of embodiments of present disclosure will be given in part in the following descriptions, become apparent in part from the following descriptions, or be learned from the practice of the embodiments of the present disclosure.

DETAILED DESCRIPTION

Embodiments of the present disclosure will be described in details in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the following, a method and an apparatus for identifying an application causing a temperature rise of a terminal and a terminal according to embodiments of the present disclosure will be described with reference to drawings.

Figure 1:
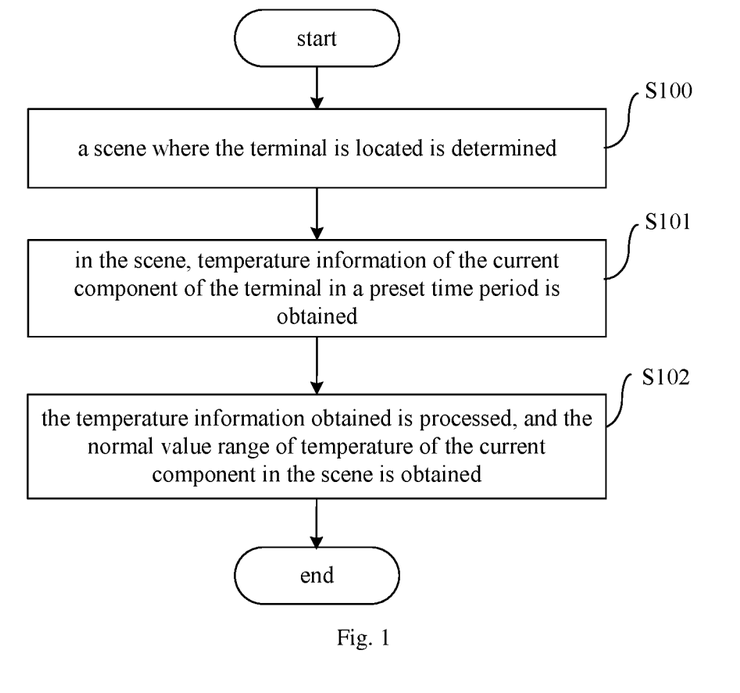
FIG. 1 is a flow chart of a method for obtaining a normal value range of temperature of a terminal component according to an embodiment of the present disclosure.

FIG. 1 is a flow chart of a method for obtaining a normal value range of temperature of a terminal component according to an embodiment of the present disclosure. As shown in FIG. 1, the method may include followings.

In S100, a scene where the terminal is located is determined.

In the embodiment, the terminals may be hardware devices having various operation systems like personal computers, cellphones, and tablet computers.

The scene may include but be not limited to an environment where the terminal is located and/or a status of the terminal. The environment where the terminal is located may include an indoor environment and an outdoor environment. The status of the terminal may include an idle status and a non-idle status.

For example, according to a light sensor or a position sensor, it may be determined that the environment where the terminal is located is the indoor or the outdoor environment.

In S101, in the scene, temperature information of the current component of the terminal in a preset time period is obtained.

In detail, after determining the scene where the terminal is located, in the scene, the temperature information of the current component in the preset time period may be obtained from a system interface of the terminal according to a first sampling period. The preset time period may be a default in the terminal system, and may also be set in the terminal system according to different needs of the user. The current component may be a component like a CPU, a display card, a sound card and a memory, which shall not be limited in the embodiment.

For example, assuming that the terminal is the cellphone, the current component is the CPU, and the cellphone is in the indoor environment, and then the temperature information of the CPU in the preset time period (e.g. 30 minutes) may be obtained from the system interface of the cellphone according to the first sampling period (e.g. 10 seconds).

For another example, assuming that the terminal is in the outdoor environment, the current component is the display card, and then the temperature information of the display card in the preset time period (e.g. 20 minutes) may be obtained from the system interface of the terminal according to the first sampling period (e.g. 2 minutes).

In S102, the temperature information obtained is processed, and the normal value range of temperature of the current component in the scene is obtained.

In the embodiment, a temperature value obtained is processed using a preset algorithm, and in the environment where the terminal is located, the normal value range of the temperature of the current component when the terminal is in the idle status or in the non-idle status is obtained. The preset algorithm may include a peak clipping algorithm.

In detail, it is determined that the environment where the terminal is located is the indoor environment, and assuming that the terminal is in the idle status, the temperature information of the current component in the preset time period (e.g. 30 minutes) obtained from the system interface of the terminal according to the first sampling period (e.g. 5 seconds) is processed using the peak clipping algorithm, i.e. sampling values of the temperature of the current component in the preset time period (e.g. 30 minutes) may be processed using the peak clipping algorithm, and according to the process, the normal value range of the temperature of the current component when the terminal is in the idle status in the preset time period (e.g. 30 minutes) may be obtained.

For example, the terminal is in the indoor environment, the current component is the CPU, and the terminal is in the idle status, assuming that the preset time period is 20 minutes, and the first sampling period is 5 seconds, and then 240 sampling values of the CPU temperature may be obtained. The 240 sampling values include: 60 sampling values with CPU temperature 25° C., 60 sampling values with CPU temperature 28° C., 80 sampling values with CPU temperature 30° C., 20 sampling values with CPU temperature 29° C., and 20 sampling values with CPU temperature 40° C., and then, the 20 sampling values with CPU temperature 40° C. may be deleted, and finally the normal value range of the CPU temperature when the terminal is in the idle status in 20 minutes may be obtained to be 25° C.~30° C.

If the terminal is in the non-idle status, the temperature information of the current component in the preset time period (e.g. 30 minutes) may be obtained from the system interface of the terminal according to the first sampling period (e.g. 5 seconds), and after the temperature information is obtained, similarly, the sampling values of the current component in the preset time period (e.g. 30 minutes) may be processed using the peak clipping algorithm, and the normal value range of the temperature of the current component when the terminal is in the non-idle status in the preset time period (e.g. 30 minutes) may be obtained via the processing.

In addition, in the embodiment, the normal value range of the temperature of the current component when the terminal is in the non-idle status may also be obtained through a following method: after obtaining the normal value range of the temperature of the current component when the terminal is in the idle status, setting a first weight according to a load status of the current component, and calculating the normal value range of the temperature of the component when the terminal is in the load status according to the first weight and the normal value range of the temperature of the current component when the terminal is in the idle status.

For example, the terminal is in the indoor environment, the current component is the CPU, assuming that the normal value range of the CPU temperature when the terminal is in the idle status is 25° C.~30° C., when the terminal is in the non-idle status, the CPU in the corresponding terminal will be in a load status, if the preset time period is e.g. 10 minutes, the load status of the CPU is 10%, according to the load status, the corresponding weight may be e.g. 1.1, and then, the normal value range of the CPU temperature when the terminal is in the idle status 25° C.~30° C. may be multiplied with the first weight 1.1, such that the normal value range of the CPU temperature in 10 minutes is 27.5° C.~33° C.

It should be noted that, different load statuses correspond to different first weights, and the corresponding relationship between the load status and the first weight is an experience value obtained by analyzing according to a great amount of history data.

According to the method embodiments for obtaining the normal temperature range of the temperature of the terminal component, the scene where the terminal is located is determined, the temperature information of the current component of the terminal in the preset time period in the scene is obtained, and the temperature information obtained is processed so as to obtain the normal value range of the temperature of the current component in the scene, therefore, the normal value ranges of the temperature of the terminal component in different scenes may be accurately obtained, and the user may be acknowledged with the operation situation of the terminal component conveniently.

Figure 2:
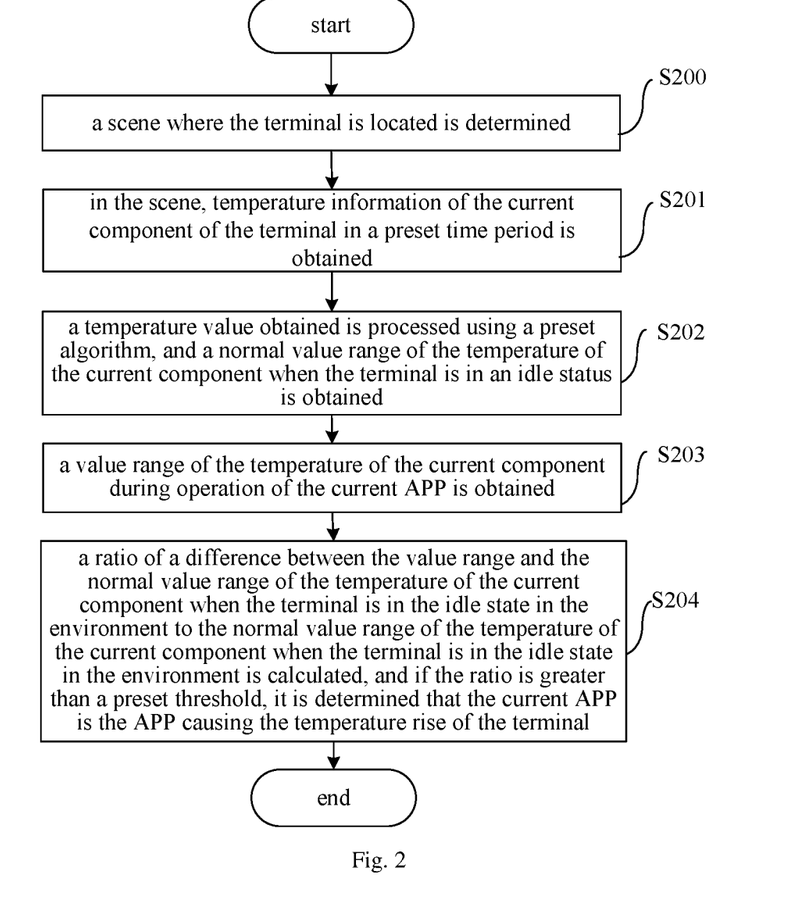
FIG. 2 is a flow chart of a method for identifying an application causing a temperature rise of a terminal according to an embodiment of the present disclosure.

Generally, the APP operated in a terminal will cause a temperature change of a terminal component, and if the temperature change of the terminal component caused by the APP running in the terminal exceeds a preset threshold, the APP running in the terminal is easy to cause a temperature rise of the terminal. The preset threshold may be a default in the terminal system, and may also be set in the terminal system according to different needs of the user. Specifically, the process of identifying an APP causing a temperature rise of a terminal is shown in FIG. 2. FIG. 2 is a flow chart of a method for identifying an application causing a temperature rise of a terminal according to an embodiment of the present disclosure. The embodiment is described taking the example of the terminal that only runs an APP currently. As shown in FIG. 2, the method includes followings.

In S200, a scene where the terminal is located is determined.

S200 is same to S100, and the description on S100 is also suitable to S200.

In S201, in the scene, temperature information of the current component of the terminal in a preset time period is obtained.

S201 is same to S101, and the description on S101 is also suitable to S201.

In S202, a temperature value obtained is processed using a preset algorithm, and a normal value range of the temperature of the current component when the terminal is in an idle status is obtained.

In the embodiment, the preset algorithm may include a peak clipping algorithm. In detail, the environment where the terminal is located (e.g. an indoor environment) is obtained, and when the terminal is in the idle status, the temperature information of the current component in the preset time period (e.g. 30 minutes) obtained from the component interface of the terminal according to the first sampling period (e.g. 5 seconds) is processed using the peak clipping algorithm, i.e. the sampling values of the temperature of the current component in the preset time period (e.g. 30 minutes) may be processed using the peak clipping algorithm, and the normal value range of the temperature of the current component when the terminal is in the idle status in the preset time period (e.g. 30 minutes) may be obtained according to the process.

For example, the current component is a CPU, the normal value range of the temperature of the current component when the terminal is in the idle status in the preset time period (e.g. 30 minutes) obtained using the peak clipping algorithm is 25° C.~30° C.

In S203, a value range of the temperature of the current component during operation of the current APP is obtained.

In the embodiment, the temperature information of the current component during the operation of the current APP may be obtained according to a second sampling period, and the temperature information obtained according to the second sampling period is processed using the peak clipping algorithm, and the value range of the temperature of the current component is obtained during the operation of the current APP.

It should be noted that, the first sampling period and the second sampling period may be the same, and also may not be the same.

In S204, a ratio of a difference between the value range and the normal value range of the temperature of the current component when the terminal is in the idle state in the environment to the normal value range of the temperature of the current component when the terminal is in the idle state in the environment is calculated, and if the ratio is greater than a preset threshold, it is determined that the current APP is the APP causing the temperature rise of the terminal.

For example, the current component is the CPU, the normal value range of the CPU temperature when the terminal is in the idle status is 25° C.~30° C., the value range of the CPU temperature during the operation of the current APP is 36° C.~40° C. Assuming that a preset threshold is 15%, determining whether a minimum ratio of the CPU temperature during the operation of the current APP to the CPU temperature when the terminal is in the idle status is greater than 15%, the minimum ratio of the CPU temperature during the operation of the current APP to the CPU temperature when the terminal is in the idle status is calculated as 0.2 (20%), which is greater than 15%, and then it is determined that the current APP may cause the temperature rise of the terminal.

In the embodiment, after determining that the current APP is the APP causing the temperature rise of the terminal, reminding information may also be displayed in the terminal. In detail, guidance information for stopping or uninstalling the current APP may be displayed in the terminal, such that the user may stop or uninstall the APP causing the temperature rise of the terminal according to the guidance information conveniently.

After displaying the guidance information, if the user needs to stop or uninstall the APP causing the temperature rise of the terminal, a trigger operation executed by the user according to the guidance information may be obtained, and the APP causing the temperature rise of the terminal may be stopped or uninstalled based on the trigger operation.

According to the method embodiments for identifying the application causing the temperature rise of the terminal, the value range of the temperature of the current component during the operation of the current APP in the environment where the terminal is located is obtained, the ratio of the difference between the value range and the normal value range of the temperature of the current component when the terminal is in the idle state in the environment to the normal value range of the temperature of the current component when the terminal is in the idle state in the environment is calculated, and if the ratio is greater than the preset threshold, it is determined that the current APP is the APP causing the temperature rise of the terminal, accordingly, the APP causing the temperature rise of the terminal may identified accurately, such that when the APP causing the temperature rise of the terminal is determined, the user may be reminded to process the APP so as to reduce the effect of the APP on the terminal.

Figure 3:
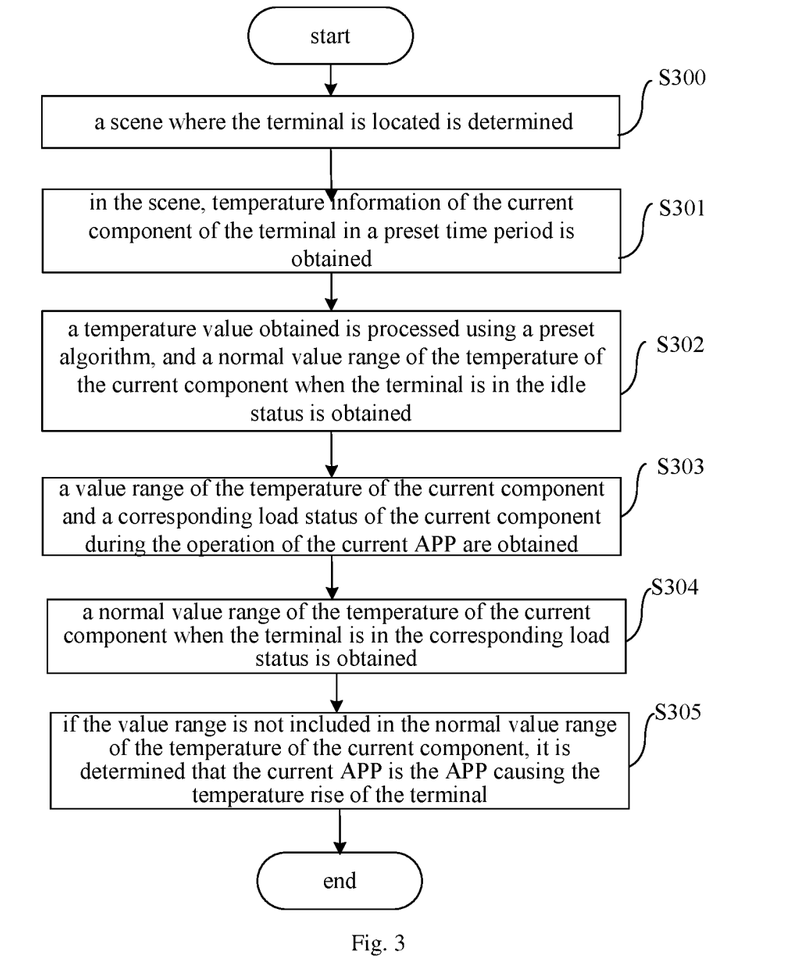
FIG. 3 is a flow chart of a method for identifying an application causing a temperature rise of a terminal according to another embodiment of the present disclosure.

FIG. 3 is a flow chart of a method for identifying an application causing a temperature rise of a terminal according to another embodiment of the present disclosure. The embodiment is described taking the example of the terminal that only runs an APP currently. As shown in FIG. 3, the method includes followings.

In S300, a scene where the terminal is located is determined.

S300 is same to S100, and the description on S100 is also suitable to S300.

In S301, in the scene, temperature information of the current component of the terminal in a preset time period is obtained.

S301 is same to S101, and the description on S101 is also suitable to S301.

In S302, a temperature value obtained is processed using a preset algorithm, and a normal value range of the temperature of the current component when the terminal is in the idle status is obtained.

In the embodiment, the preset algorithm may include a peak clipping algorithm. In detail, when the terminal is in the idle status, the temperature information of the current component in the preset time period (e.g. 30 minutes) obtained from the component interface of the terminal according to the first sampling period (e.g. 5 seconds) is processed using the peak clipping algorithm, i.e. the sampling values of the temperature of the current component in the preset time period (e.g. 30 minutes) may be processed using the peak clipping algorithm, and the normal value range of the temperature of the current component when the terminal is in the idle status in the preset time period (e.g. 30 minutes) may be obtained according to the process.

For example, the current component is a CPU, the normal value range of the temperature of the current component when the terminal is in the idle status in the preset time period (e.g. 30 minutes) obtained using the peak clipping algorithm is 25° C.~30° C.

In S303, a value range of the temperature of the current component and a corresponding load status of the current component during the operation of the current APP are obtained.

In the embodiment, the temperature information of the current component during the operation of the current APP may be obtained according to a second sampling period, the temperature information obtained according to the second sampling period is processed using the peak clipping algorithm, and the value range of the temperature of the current component is obtained during the operation of the current APP.

It should be noted that, the first sampling period and the second sampling period may be the same, and also may not be the same.

In S304, a normal value range of the temperature of the current component when the terminal is in the corresponding load status is obtained.

In detail, a first weight is set according to the corresponding load status of the current component during the operation of the current APP, the normal value range of the temperature of the current component when the terminal is in the corresponding load status is calculated according to the first weight and the normal value range of the temperature of the current component when the terminal is in the idle status.

It should be noted that, different load statuses correspond to different first weights, and the corresponding relationship between the load status and the first weight is an experience value obtained by analyzing according to a great amount of history data.

For example, the current component is the CPU, assuming that the normal value range of the CPU temperature when the terminal is in the idle status is 25° C.~30° C., and the corresponding load status of the CPU during the operation of the current APP is 10%, the corresponding first weight e.g. 1.1 is obtained according to the loading status, and then, the normal value range 25° C.~30° C. of the CPU temperature when the terminal is in the idle status is multiplied with the first weight e.g. 1.1, so as to obtain the normal value range 27.5° C.~33° C. of the corresponding CPU temperature during the operation of the current APP.

In S305, if the value range is not included in the normal value range of the temperature of the current component, it is determined that the current APP is the APP causing the temperature rise of the terminal.

For example, the current component is the CPU, the value range of the CPU temperature during the operation of the current APP is calculated to be 29° C.~35° C., the normal value range of the corresponding CPU temperature during the operation of the current APP is 27.5° C.~33° C., it may be determined that the value range of the CPU temperature during the operation of the current APP is not included in the corresponding normal value range by comparing, and then it may be determined that the current APP is the APP causing the temperature rise of the terminal.

In the embodiment, after determining that the current APP is the APP causing the temperature rise of the terminal, reminding information may also be displayed in the terminal. In detail, s guidance information for topping or uninstalling the current APP may be displayed in the terminal, such that the user may stop or uninstall the APP causing the temperature rise of the terminal according to the guidance information conveniently.

After displaying the guidance information, if the user needs to stop or uninstall the APP causing the temperature rise of the terminal, a trigger operation executed by the user according to the guidance information may be obtained, and the APP causing the temperature rise of the terminal may be stopped or uninstalled based on the trigger operation.

According to the method embodiments for identifying the application causing the temperature rise of the terminal, the value range of the temperature of the current component during the operation of the current APP in the environment where the terminal is located is obtained, and the normal value range of the temperature of the current component when the terminal is in the corresponding load status is obtained, and if the value range is not included in the normal value range, it is determined that the current APP is the APP causing the temperature rise of the terminal, accordingly, the APP causing the temperature rise of the terminal may identified accurately, such that when the APP causing the temperature rise of the terminal is determined, the user may be reminded to process the APP so as to reduce the effect of the APP on the terminal.

Figure 4:
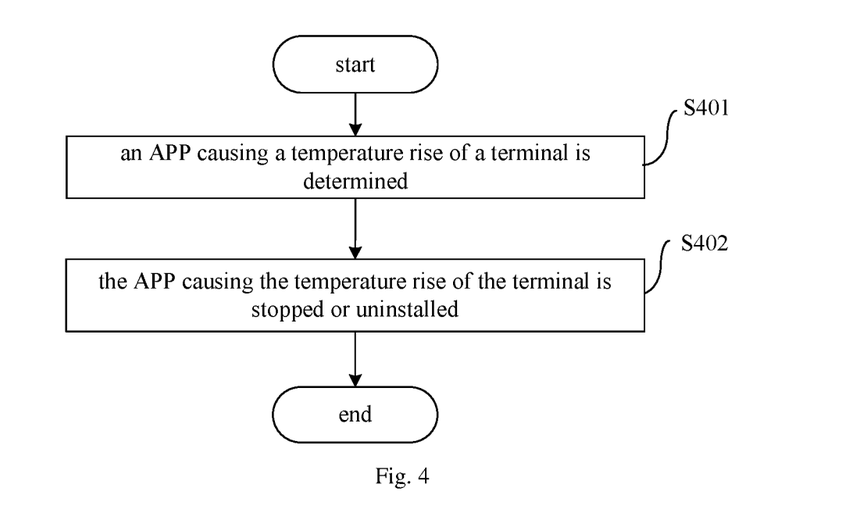
FIG. 4 is a flow chart of a method for reducing terminal temperature according to an embodiment of the present disclosure.

FIG. 4 is a flow chart of a method for reducing terminal temperature according to an embodiment of the present disclosure. As shown in FIG. 4, the method includes followings.

In S401, an APP causing a temperature rise of a terminal is determined.

In detail, in an environment where the terminal is located, if only one APP is operated in the terminal, the value range of the temperature of the current component of the terminal during the operation of the current APP is obtained; and a ratio of a difference between the value range and a normal value range of the temperature of the current component when the terminal is in an idle state in the environment to the normal value range of the temperature of the current component when the terminal is in the idle state in the environment is calculated; if the ratio is greater than a preset threshold, it is determined that the current APP is the APP causing the temperature rise of the terminal. The environment where the terminal is located may be an indoor environment, and may also be an outdoor environment. It should be noted that, the detailed process of determining that the APP causing the temperature rise of the terminal may refer to FIG. 2, which shall not be elaborated herein.

The preset threshold may be a default in the terminal system, and may also be set in the terminal system according to different needs of the user.

In addition, as an alternative method, in the environment where the terminal is located, if only one APP is operated in the terminal, another method may also be used to identify that the current APP is the APP causing the temperature rise of the terminal. In detail, a value range of the temperature of the current component and a corresponding load status of the current component during the operation of the current APP are obtained; a normal value range of the temperature of the current component when the terminal is in the corresponding load status is obtained; and if the value range is not included in the normal value range, it is determined that the current APP is the APP causing the temperature rise of the terminal. It should be noted that, the detailed process of determining that the APP causing the temperature rise of the terminal may refer to FIG. 3, which shall not be elaborated herein.

In the embodiment, temperature information of the current component during the operation of the current APP may be obtained according to a second sampling period, the temperature information obtained according to the second sampling period is processed using a peak clipping algorithm, and a value range of the temperature of the current component during the operation of the current APP is obtained.

In the environment where the terminal is located, if multiple Apps are operated in the terminal, the value range of the temperature of the current component during the operation of each APP is obtained, the APPs are sorted according to the value range and the normal value range of the temperature of the current component when the terminal is in the idle status, and an APP list causing the temperature rise of the terminal is determined according to a sorting result.

In the embodiment, the method of obtaining the value range of the temperature of the current component during operation of each application may include: obtaining occupation information of the current component for each application, distributing a second weight to each application according to the occupation information, and calculating the value range of the temperature of the current component according to the second weight during the operation of each application.

In the embodiment, occupation information e.g. may be a time length, and may also be a size of the resource occupying the current component, since the occupation information for each APP is different; the corresponding second weight is also different.

For example, assuming that the occupation information is the time length, the current component is the CPU, the value range of the CPU temperature during the operation of the APP is 25° C.~30° C., and 5 applications APP1, APP2, APP3, APP4 and APP5 are currently operated in the terminal. According to a time length occupying the CPU for each APP, the second weight for each APP may respectively is 2, 1, 3, 1.5 and 2.5, and according to the weight of each APP, the corresponding value range of the CPU temperature for APP1, APP2, APP3, APP4 and APP5 is 5° C.~6° C., 2.5° C.~3° C., 7.5° C.~9° C., 3.75° C.~4.5° C. and 6.25° C.~7.5° C. respectively, and after calculating the value range of each APP, the 5 APPs may be sorted according to the value range, and the order of the sorted APPs is APP3, APP5, APP1, APP4 and APP2.

In addition, in the embodiment, before calculating the ratio or sorting the APPs, the normal value range of the temperature of the terminal component may also be obtained. In detail, in the scene, temperature information of the current component of the terminal is obtained in the preset time period, the temperature information obtained is processed, and the normal value range of the temperature of the current component in the scene is obtained.

It should be noted that, the detailed process of obtaining the normal value range of the temperature of the terminal component may refer to FIG. 1, which shall not be elaborated herein.

In detail, in the environment where the terminal is located, the temperature information of the current component in the preset time period may be obtained from a system interface of the terminal according to a first sampling period, and the temperature values obtained may be processed using a preset algorithm. The preset algorithm includes a peak clipping algorithm and the normal value range of the temperature of the current component when the terminal is in an idle status or in a non-idle status is obtained.

In the embodiment, the normal value range of the temperature of the current component when the terminal is in the non-idle status may also be obtained according a following method.

After obtaining the normal value range of the temperature of the current component when the terminal is in the idle status, a first weight may be set according to a load status of the current component, a normal value range of the temperature of the current component when the terminal is in the load status is calculated according to the first weight and the normal value range of the temperature of the current component when the terminal is in the idle status.

For example, the terminal is in the indoor environment, the current component is the CPU, assuming that the normal value range of the CPU temperature when the terminal is in the idle status is 25° C.~30° C., when the terminal is in the non-idle status, the CPU in the corresponding terminal will be in a load status, if the preset time period is e.g. 10 minutes, the load status of the CPU is 10%, according to the load status, the corresponding weight may be e.g. 1.1, and then, the normal value range of the CPU temperature when the terminal is in the idle status 25° C.~30° C. may be multiplied with the first weight 1.1, such that the normal value range of the CPU temperature in 10 minutes is 27.5° C.~33° C.

It should be noted that, different load statuses correspond to different first weights, and the corresponding relationship between the load status and the first weight is an experience value obtained by analyzing according to a great amount of history data.

In S402, the APP causing the temperature rise of the terminal is stopped or uninstalled.

If only one APP is operated in the terminal, and the current APP is determined to be the APP causing the temperature rise of the terminal, the guidance information for stopping or uninstalling the current APP will be displayed in the terminal, which is convenient for the user to stop or uninstall the APP causing the temperature rise of the terminal according to the guidance information.

After displaying the guidance information, if the user needs to stop or uninstall the APP causing the temperature rise of the terminal, a trigger operation executed by the user according to the guidance information may be obtained, and the APP causing the temperature rise of the terminal may be stopped or uninstalled based on the trigger operation.

If multiple APPs are operated in the terminal, the APP list causing the temperature rise of the terminal is determined according to a sorting result, the guidance information is displayed in the terminal, and the APP causing the temperature rise of the terminal may be stopped or uninstalled based on the trigger operation.

For example, an APP list includes 5 APPs causing the temperature rise of the terminal, the guidance information of the APP list including 5 APPs is displayed in the terminal, one or more APPs causing the temperature rise of the terminal may be stopped or uninstalled according to the need by the user, and one or more APPs causing the temperature rise of the terminal may be stopped or uninstalled according to the trigger operation of the user by the terminal. Accordingly, the effect on the terminal of the APP is reduced, an overheating phenomenon of the terminal may be avoided, and the user experience of the terminal is improved.

According to the above method embodiments for reducing the temperature of the terminal, the APP causing the temperature rise of the terminal is determined, the APP causing the temperature rise of the terminal is stopped or uninstalled, therefore, the effect on the terminal of the APP is reduced, an overheating phenomenon of the terminal may be avoided, and the user experience of the terminal is improved.

In order to realize the above embodiments, an apparatus for identifying an application causing a temperature rise of a terminal is further provided in the present disclosure.

Figure 5:
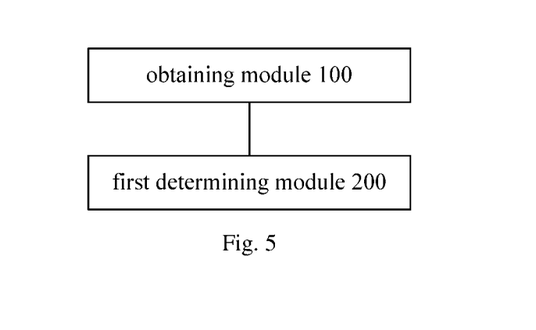
FIG. 5 is a schematic diagram of an apparatus for identifying an application causing a temperature rise of a terminal according to an embodiment of the present disclosure.

FIG. 5 is a schematic diagram of an apparatus for identifying an application causing a temperature rise of a terminal according to an embodiment of the present disclosure. As shown in FIG. 5, the apparatus includes an obtaining module 100 and a first determining module 200.

The obtaining module 100 is configured to obtain a value range of temperature of a current component of the terminal during the operation of a current APP in an environment where the terminal is located; and the first determining module 200 is configured to calculate a ratio of a difference between the value range and a normal value range of the temperature of the current component when the terminal is in an idle state in the environment to the normal value range of the temperature of the current component when the terminal is in the idle state in the environment, and if the ratio is greater than a preset threshold, to determine that the current APP is the APP causing the temperature rise of the terminal is.

The obtaining module 100 may obtain temperature information of the current component during the operation of the current APP according to a second sampling period, process the temperature information obtained according to the second sampling period using the peak clipping algorithm, and obtain the value range of the temperature of the current component during the operation of the current APP.

Figure 6:
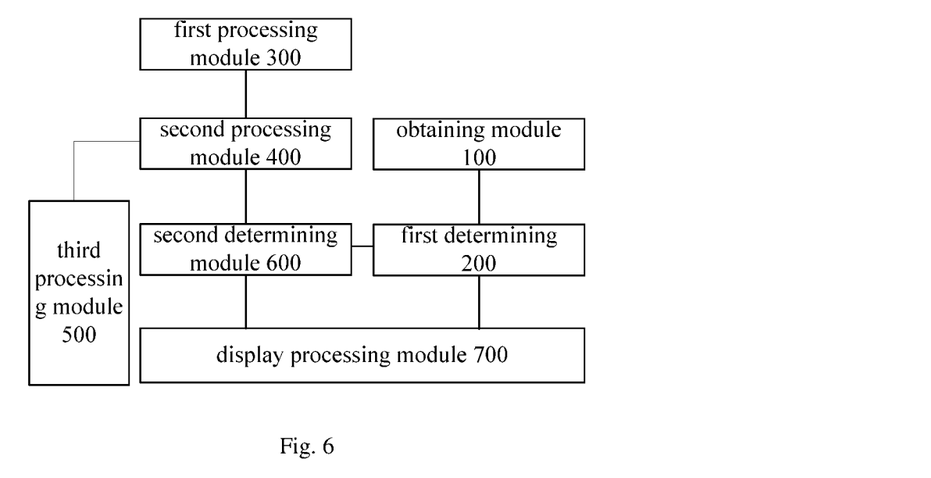
FIG. 6 is a schematic diagram of an apparatus for identifying an application causing a temperature rise of a terminal according to another embodiment of the present disclosure.

In order to obtain the normal value range of the temperature of the current component in the scene, as shown in FIG. 6, the apparatus may further include a first processing module 300. The first processing module 300 is configured to determine a scene where the terminal is located before the first determining module 200 calculates a ratio of a difference between the value range and a normal value range of the temperature of the current component when the terminal is in an idle state in the environment to the normal value range of the temperature of the current component when the terminal is in the idle state in the environment; to obtain temperature information of the current component of the terminal in a preset time period in the scene; and to process the temperature information obtained, and to obtain a normal value range of the temperature of the current component in the scene.

The scene may include but be not limited to an environment where the terminal is located and/or a status of the terminal. The environment where the terminal is located may include an indoor environment and an outdoor environment. The status of the terminal may include an idle status and a non-idle status. The component may be a CPU, a display card, a sound card and the like.

The first processing module 300 is specifically configured to obtain temperature information of the current component in the preset time period. The preset time period may be a default in the terminal system, and may also be set in the terminal system according to different needs of the user.

In detail, the first processing module 300 may obtain multiple sampling values of the current component e.g. the CPU in the preset time period e.g. 30 minutes.

The first processing module 300 is specifically configured to process a temperature value obtained using a preset algorithm, in which the preset algorithm includes a peak clipping algorithm; and in the environment, to obtain the normal value range of the temperature of the current component when the terminal is in the idle status or a normal value range of the temperature of the current component when the terminal is in the non-idle status.

Alternatively, the apparatus may further include a second processing module 400. The second processing module 400 is configured to set a first weight according to a load status of the current component after the first processing module 300 obtains the normal value range of the temperature of the current component when the terminal is in the idle status, and to calculate a normal value range of the temperature of the current component when the terminal is in the load status according to the first weight and the normal value range of the temperature of the current component when the terminal is in the idle status. According to the second processing module 400, the normal value range of the temperature of the current component when the terminal is in the non-idle status may also be obtained.

In order to identify the APP causing the temperature rise of the terminal, the apparatus may further include a third processing module 500. The third processing module 500 is configured to obtain a value range of the temperature of the current component during operation of each APP after the first processing module 300 obtains the normal value range of the temperature of the current component when the terminal is in the idle status, and to sort applications according to the value range and the normal value range of the temperature of the current component when the terminal is in the idle status, and to determine an application list causing the temperature rise of the terminal according to a sorting result.

The third processing module 500 is specifically configure to obtain temperature information of the current component according to a second sampling period during the operation of the current APP, to process the temperature information obtained according to the second sampling period using a peak clipping algorithm, and to obtain the value range of the temperature of the current component during the operation of the current APP, in which, the preset time period may be a default in the terminal system, and may also be set in the terminal system according to different needs of the user.

Alternatively, the apparatus may further include a second determining module 600. The second determining module 600 is configured to obtain a value range of the temperature of the current component and a corresponding load status of the current component during the operation of the current APP; to obtain a normal value range of the temperature of the current component when the terminal is in the corresponding load status; and if the value range of the temperature of the current component is not included in the normal value range of the temperature of the current component, to determine that the current APP is the APP causing the temperature rise of the terminal. According to the second determining module 600, the APP causing the temperature rise of the terminal may also be identified.

The second determining module 600 is specifically configured to obtain temperature information of the current component according to a second sampling period during the operation of the current APP, to process the temperature information obtained according to the second sampling period using a peak clipping algorithm, and to obtain the value range of the temperature of the current component during the operation of the current APP.

In order to make it convenient for the user to process the APP causing the temperature rise of the terminal, the apparatus may further include a display processing module 700. The display processing module 700 is configured to display guidance information after the APP causing the temperature rise of the terminal is determined by the first determining module 200 or the second determining module 600; and to obtain a trigger operation executed by a user according to the guidance information, and to stop or uninstall the APP causing the temperature rise of the terminal based on the trigger operation.

The detailed process of determining the APP causing the temperature rise of the terminal by the apparatus for identifying an application causing a temperature rise of a terminal including the obtaining module 100, the first determining module 200, the first processing module 300, the second processing module 400, the third processing module 500, the second determining module 600 and the display processing module 700 may refer to FIG. 2 or 3, which shall not be elaborated herein.

According to apparatus embodiments for identifying an application causing a temperature rise of a terminal provided in embodiments of the present disclosure, the value range of the temperature of the current component of the terminal during the operation of the current APP is obtained according to the obtaining module, and the ratio of the difference between the value range and the normal value range of the temperature of the current component when the terminal is in the idle state in the environment to the normal value range of the temperature of the current component when the terminal is in the idle state in the environment is calculated according to the first determining module; if the ratio is greater than the preset threshold, it is determined that the current APP is the APP causing the temperature rise of the terminal. Accordingly, the APP causing the temperature rise of the terminal may be accurately identified, such that the user may be reminded to process the APP when the APP causing the temperature rise of the terminal is determined, so that the effect on the terminal of the APP is reduced.

In order to realize the above embodiments, a terminal is further provided in the present disclosure. The terminal includes: a shell, a processor, a memory, a circuit board and a power supply circuit, in which, the circuit board is disposed in an interior space surrounded by the shell, the processor and the memory are disposed on the circuit board; the power supply circuit is configured to supply electricity for each circuit or element of the mobile terminal; the memory is configured to store executable program codes; and the processor is configured to run a program corresponding to the executable program codes by reading the executable program codes stored in the memory, so as to execute followings.

In S100', a scene where the terminal is located is determined.

In the embodiment, the terminals may be hardware devices having various operation systems like personal computers, cellphones, and tablet computers.

The scene may include but be not limited to an environment where the terminal is located and/or a status of the terminal. The environment where the terminal is located may include an indoor environment and an outdoor environment. The status of the terminal may include an idle status and a non-idle status.

For example, according to a light sensor or a position sensor, it may be determined that the environment where the terminal is located is the indoor or the outdoor environment.

In S101', in the scene, temperature information of the current component of the terminal in a preset time period is obtained. In detail, after determining the scene where the terminal is located, in the scene, the temperature information of the current component in the preset time period may be obtained from a system interface of the terminal according to a first sampling period. The preset time period may be a default in the terminal system, and may also be set in the terminal system according to different needs of the user. The current component may be a component like a CPU, a display card, a sound card and a memory, which shall not be limited in the embodiment.

For example, assuming that the terminal is the cellphone, the current component is the CPU, and the cellphone is in the indoor environment, and then the temperature information of the CPU in the preset time period (e.g. 30 minutes) may be obtained from the system interface of the cellphone according to the first sampling period (e.g. 10 seconds).

For another example, assuming that the terminal is in the outdoor environment, the current component is the display card, and then the temperature information of the display card in the preset time period (e.g. 20 minutes) may be obtained from the system interface of the terminal according to the first sampling period (e.g. 2 minutes).

In S102', the temperature information obtained is processed, and the normal value range of temperature of the current component in the scene is obtained.

In the embodiment, a temperature value obtained is processed using a preset algorithm, and in the environment where the terminal is located, the normal value range of the temperature of the current component when the terminal is in the idle status or in the non-idle status is obtained. The preset algorithm may include a peak clipping algorithm.

In detail, it is determined that the environment where the terminal is located is the indoor environment, and assuming that the terminal is in the idle status, the temperature information of the current component in the preset time period (e.g. 30 minutes) obtained from the system interface of the terminal according to the first sampling period (e.g. 5 seconds) is processed using the peak clipping algorithm, i.e.

sampling values of the temperature of the current component in the preset time period (e.g. 30 minutes) may be processed using the peak clipping algorithm, and according to the process, the normal value range of the temperature of the current component when the terminal is in the idle status in the preset time period (e.g. 30 minutes) may be obtained.

For example, the terminal is in the indoor environment, the current component is the CPU, and the terminal is in the idle status, assuming that the preset time period is 20 minutes, and the first sampling period is 5 seconds, and then 240 sampling values of the CPU temperature may be obtained. The 240 sampling values include: 60 sampling values with CPU temperature 25° C., 60 sampling values with CPU temperature 28° C., 80 sampling values with CPU temperature 30° C., 20 sampling values with CPU temperature 29° C., and 20 sampling values with CPU temperature 40° C., and then, the 20 sampling values with CPU temperature 40° C. may be deleted, and finally the normal value range of the CPU temperature when the terminal is in the idle status in 20 minutes may be obtained to be 25° C.~30° C.

If the terminal is in the non-idle status, the temperature information of the current component in the preset time period (e.g. 30 minutes) may be obtained from the system interface of the terminal according to the first sampling period (e.g. 5 seconds), and after the temperature information is obtained, similarly, the sampling values of the current component in the preset time period (e.g. 30 minutes) may be processed using the peak clipping algorithm, and the normal value range of the temperature of the current component when the terminal is in the non-idle status in the preset time period (e.g. 30 minutes) may be obtained via the processing.

In addition, in the embodiment, the normal value range of the temperature of the current component when the terminal is in the non-idle status may also be obtained through a following method: after obtaining the normal value range of the temperature of the current component when the terminal is in the idle status, setting a first weight according to a load status of the current component, and calculating the normal value range of the temperature of the component when the terminal is in the load status according to the first weight and the normal value range of the temperature of the current component when the terminal is in the idle status.

For example, the terminal is in the indoor environment, the current component is the CPU, assuming that the normal value range of the CPU temperature when the terminal is in the idle status is 25° C.~30° C., when the terminal is in the non-idle status, the CPU in the corresponding terminal will be in a load status, if the preset time period is e.g. 10 minutes, the load status of the CPU is 10%, according to the load status, the corresponding weight may be e.g. 1.1, and then, the normal value range of the CPU temperature when the terminal is in the idle status 25° C.~30° C. may be multiplied with the first weight 1.1, such that the normal value range of the CPU temperature in 10 minutes is 27.5° C.~33° C.

It should be noted that, different load statuses correspond to different first weights, and the corresponding relationship between the load status and the first weight is an experience value obtained by analyzing according to a great amount of history data.

In addition, in the process of identifying the APP causing the temperature rise of the terminal, the processor is further configured to execute followings.

In S200', a scene where the terminal is located is determined.

In the embodiment, the terminals may be hardware devices having various operation systems like personal computers, cellphones, and tablet computers.

The scene may include but be not limited to an environment where the terminal is located and/or a status of the terminal. The environment where the terminal is located may include an indoor environment and an outdoor environment. The status of the terminal may include an idle status and a non-idle status.

For example, according to a light sensor or a position sensor, it may be determined that the environment where the terminal is located is the indoor or the outdoor environment.

In S201', in the scene, temperature information of the current component of the terminal in a preset time period is obtained.

In detail, after determining the scene where the terminal is located, in the scene, the temperature information of the current component in the preset time period may be obtained from a system interface of the terminal according to a first sampling period. The preset time period may be a default in the terminal system, and may also be set in the terminal system according to different needs of the user. The current component may be a component like a CPU, a display card, a sound card and a memory, which shall not be limited in the embodiment.

For example, assuming that the terminal is the cellphone, the current component is the CPU, and the cellphone is in the indoor environment, and then the temperature information of the CPU in the preset time period (e.g. 30 minutes) may be obtained from the system interface of the cellphone according to the first sampling period (e.g. 10 seconds).

For another example, assuming that the terminal is in the outdoor environment, the current component is the display card, and then the temperature information of the display card in the preset time period (e.g. 20 minutes) may be obtained from the system interface of the terminal according to the first sampling period (e.g. 2 minutes).

In S202', a temperature value obtained is processed using a preset algorithm, and a normal value range of the temperature of the current component when the terminal is in an idle status is obtained.

In the embodiment, the preset algorithm may include a peak clipping algorithm. In detail, the environment where the terminal is located (e.g. an indoor environment) is obtained, and when the terminal is in the idle status, the temperature information of the current component in the preset time period (e.g. 30 minutes) obtained from the component interface of the terminal according to the first sampling period (e.g. 5 seconds) is processed using the peak clipping algorithm, i.e. the sampling values of the temperature of the current component in the preset time period (e.g. 30 minutes) may be processed using the peak clipping algorithm, and the normal value range of the temperature of the current component when the terminal is in the idle status in the preset time period (e.g. 30 minutes) may be obtained according to the process.

For example, the current component is a CPU, the normal value range of the temperature of the current component when the terminal is in the idle status in the preset time period (e.g. 30 minutes) obtained using the peak clipping algorithm is 25° C.~30° C.

In S203', a value range of the temperature of the current component during operation of the current APP is obtained.

In the embodiment, the temperature information of the current component during the operation of the current APP may be obtained according to a second sampling period, and the temperature information obtained according to the second sampling period is processed using the peak clipping algorithm, and the value range of the temperature of the current component is obtained during the operation of the current APP.

It should be noted that, the first sampling period and the second sampling period may be the same, and also may not be the same.

In S204', a ratio of a difference between the value range and the normal value range of the temperature of the current component when the terminal is in the idle state in the environment to the normal value range of the temperature of the current component when the terminal is in the idle state in the environment is calculated, and if the ratio is greater than a preset threshold, it is determined that the current APP is the APP causing the temperature rise of the terminal.

For example, the current component is the CPU, the normal value range of the CPU temperature when the terminal is in the idle status is 25° C.~30° C., the value range of the CPU temperature during the operation of the current APP is 36° C.~40° C. Assuming that a preset threshold is 15%, determining whether a minimum ratio of the CPU temperature during the operation of the current APP to the CPU temperature when the terminal is in the idle status is greater than 15%, the minimum ratio of the CPU temperature during the operation of the current APP to the CPU temperature when the terminal is in the idle status is calculated as 0.2 (20%), which is greater than 15%, and then it is determined that the current APP may cause the temperature rise of the terminal.

In the embodiment, after determining that the current APP is the APP causing the temperature rise of the terminal, reminding information may also be displayed in the terminal. In detail, guidance information for stopping or uninstalling the current APP may be displayed in the terminal, such that the user may stop or uninstall the APP causing the temperature rise of the terminal according to the guidance information conveniently.

After displaying the guidance information, if the user needs to stop or uninstall the APP causing the temperature rise of the terminal, a trigger operation executed by the user according to the guidance information may be obtained, and the APP causing the temperature rise of the terminal may be stopped or uninstalled based on the trigger operation.

According to the terminal embodiments, the value range of the temperature of the current component during the operation of the current APP in the environment where the terminal is located is obtained, the ratio of the difference between the value range and the normal value range of the temperature of the current component when the terminal is in the idle state in the environment to the normal value range of the temperature of the current component when the terminal is in the idle state in the environment is calculated, and if the ratio is greater than the preset threshold, it is determined that the current APP is the APP causing the temperature rise of the terminal, accordingly, the APP causing the temperature rise of the terminal may identified accurately, such that when the APP causing the temperature rise of the terminal is determined, the user may be reminded to process the APP so as to reduce the effect of the APP on the terminal.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for identifying, among a plurality of applications operated in a terminal, an application causing a temperature rise of the terminal, the method comprising the following acts performed by the terminal:

for each application of the plurality, referred to as a current application, in an environment where the terminal is located, obtaining a respective value range of temperature of a current component of the terminal during operation of the current application;

calculating a ratio of a difference between the value range and a normal value range of the temperature of the current component when the terminal is in an idle state in the environment to the normal value range of the temperature of the current component when the terminal is in the idle state in the environment, and if the ratio is greater than a preset threshold, determining that the current application is the application causing the temperature rise of the terminal;

sorting the plurality of applications according to the respective value range and the normal value range of the temperature of the current component when the terminal is in the idle status, and determining an application list causing the temperature rise of the terminal according to a sorting result, wherein, before performing the calculating act, the method further comprises:

determining a scene where the terminal is located;

in the scene, obtaining temperature information of the current component of the terminal in a preset time period; and processing the temperature information obtained, and obtaining a normal value range of the temperature of the current component in the scene, and wherein the scene comprises at least one of the environment where the terminal is located and a status of the terminal, and wherein the environment indicates whether the terminal is located in an indoor environment or an outdoor environment, and the status of the terminal indicates whether the terminal is in the idle status or a non-idle status.

2. The method according to claim 1, wherein, processing the temperature information obtained, and obtaining a normal value range of the current component temperature in the scene comprises:

processing a temperature value obtained using a preset algorithm, wherein the preset algorithm comprises a peak clipping algorithm; and in the environment, obtaining the normal value range of the temperature of the current component when the terminal is in the idle status or a normal value range of the temperature of the current component when the terminal is in the non-idle status.

3. The method according to claim 2, wherein, after obtaining the normal value range of the current component temperature when the terminal is in the idle status, the method further comprises:

setting a first weight according to a load status of the current component, and calculating a normal value range of the temperature of the current component when the terminal is in the load status according to the first weight and the normal value range of the temperature of the current component when the terminal is in the idle status.

4. The method according to claim 3, further comprising:

obtaining a corresponding load status of the current component during the operation of the current application;

obtaining a normal value range of the temperature of the current component when the terminal is in the corresponding load status; and if the value range of the temperature of the current component is not included in the normal value range of the temperature of the current component, determining that the current application is the application causing the temperature rise of the terminal.

5. The method according to claim 1, wherein, obtaining temperature information of the current component of the terminal in a preset time period comprises:

obtaining the temperature information of the current component in the preset time period from a system interface of the terminal according to a first sampling period.

6. The method according to claim 1, wherein, obtaining a value range of temperature of a current component during the operation of the current application comprises:

obtaining temperature information of the current component according to a second sampling period during the operation of the current application, processing the temperature information obtained according to the second sampling period using a peak clipping algorithm, and obtaining the value range of the current component temperature during the operation of the current application.

7. The method according to claim 6, wherein, after determining that the current application is the application causing the temperature rise of the terminal, the method further comprises:

displaying guidance information; and obtaining a trigger operation executed by a user according to the guidance information, and stopping or uninstalling the application causing the temperature rise of the terminal based on the trigger operation.

8. The method according to claim 1, wherein, obtaining a value range of the temperature of the current component during operation of each application comprises:

obtaining occupation information of the current component for each application, distributing a second weight to each application according to the occupation information, and calculating the value range of the temperature of the current component according to the second weight during the operation of each application.

9. A terminal, comprising:
a shell, a processor, a memory, a circuit board and a power supply circuit, wherein, the circuit board is disposed in an interior space surrounded by the shell, the processor and the memory are disposed on the circuit board; the power supply circuit is configured to supply electricity for each circuit or element of the mobile terminal; the memory is configured to store executable program codes; and the processor is configured to run a program corresponding to the executable program codes by reading the executable program codes stored in the memory, so as to execute following acts:
for each of a plurality of applications operated in the terminal, referred to as a current application, obtaining a respective value range of temperature of a current component of the terminal during operation of the current application in an environment where the terminal is located;
calculating a ratio of a difference between the value range and a normal value range of the temperature of the current component when the terminal is in an idle state in the environment to the normal value range of the temperature of the current component when the terminal is in the idle state in the environment, and if the ratio is greater than a preset threshold, determining that the current application is the application causing the temperature rise of the terminal;
sorting the plurality of applications according to the respective value range and the normal value range of the temperature of the current component when the terminal is in the idle status; and
determining an application list causing the temperature rise of the terminal according to a sorting result,
wherein the processor is further configured to execute the following acts before performing the calculating act:
determining a scene where the terminal is located;
in the scene, obtaining temperature information of the current component of the terminal in a preset time period; and
processing the temperature information obtained, and obtaining a normal value range of the temperature of the current component in the scene, and
wherein the scene comprises at least one of the environment where the terminal is located and a status of the terminal, and wherein the environment indicates whether the terminal is located in an indoor environment or an outdoor environment, and the status of the terminal indicates whether the terminal is in the idle status or a non-idle status.

10. The terminal according to claim 9, wherein the processor is configured to execute following acts after calculating a ratio of a difference between the value range and a normal value range of the temperature of the current component when the terminal is in an idle state in the environment to the normal value range of the temperature of the current component when the terminal is in the idle state in the environment:
determining a scene where the terminal is located;
in the scene, obtaining temperature information of the current component of the terminal in a preset time period;
processing the temperature information obtained; and
obtaining a normal value range of the temperature of the current component in the scene, wherein
the scene comprises at least one of the environment where the terminal is located and a status of the terminal, and the environment where the terminal is located comprises an indoor environment and an outdoor environment, and the status of the terminal comprises the idle status and a non-idle status.

11. The terminal according to claim 10, wherein the processor is configured to process the temperature information obtained, and to obtain a normal value range of the current component temperature in the scene by acts of
processing a temperature value obtained using a preset algorithm, wherein the preset algorithm comprises a peak clipping algorithm; and
in the environment, obtaining the normal value range of the temperature of the current component when the terminal is in the idle status or a normal value range of the temperature of the current component when the terminal is in the non-idle status.

12. The terminal according to claim 11, wherein the processor is configured to execute following acts after obtaining the normal value range of the current component temperature when the terminal is in the idle status:
setting a first weight according to a load status of the current component, and calculating a normal value range of the temperature of the current component when the terminal is in the load status according to the first weight and the normal value range of the temperature of the current component when the terminal is in the idle status.

13. The terminal according to claim 12, wherein the processor is configured to execute following acts:
obtaining a corresponding load status of the current component during the operation of the current application;
obtaining a normal value range of the temperature of the current component when the terminal is in the corresponding load status; and
if the value range of the temperature of the current component is not included in the normal value range of the temperature of the current component, determining that the current application is the application causing the temperature rise of the terminal.

14. The terminal according to claim 10, wherein the processor is configured to obtain temperature information of the current component of the terminal in a preset time period by an act of
obtaining the temperature information of the current component in the preset time period from a system interface of the terminal according to a first sampling period.

15. The terminal according to claim 9, wherein the processor is configured to obtain a value range of temperature of a current component during the operation of the current application by acts of
obtaining temperature information of the current component according to a second sampling period during the operation of the current application, processing the temperature information obtained according to the second sampling period using a peak clipping algorithm, and obtaining the value range of the current component temperature during the operation of the current application.

16. The terminal according to claim 9, wherein the processor is configured to obtain a value range of the temperature of the current component during operation of each application by acts of obtaining occupation information of the current component for each application, distributing a second weight to each application according to the occupation information, and calculating the value range of the temperature of the current component according to the second weight during the operation of each application.

17. A non-transitory computer storage medium storing executable instructions, which when executed by a processor of a terminal, configure the terminal to perform a method for identifying, among a plurality of applications operated in the terminal, an application causing a temperature rise of the terminal, wherein the method comprises:

for each application of the plurality, referred to as a current application, in an environment where the terminal is located, obtaining a respective value range of temperature of a current component of the terminal during operation of the current application;

calculating a ratio of a difference between the value range and a normal value range of the temperature of the current component when the terminal is in an idle state in the environment to the normal value range of the temperature of the current component when the terminal is in the idle state in the environment;

if the ratio is greater than a preset threshold, determining that the current application is the application causing the temperature rise of the terminal; sorting the plurality of applications according to the respective value range and the normal value range of the temperature of the current component when the terminal is in the idle status; and determining an application list causing the temperature rise of the terminal according to a sorting result, wherein, before performing the calculating act, the method further comprises:

determining a scene where the terminal is located;

in the scene, obtaining temperature information of the current component of the terminal in a preset time period; and processing the temperature information obtained, and obtaining a normal value range of the temperature of the current component in the scene, and wherein the scene comprises at least one of the environment where the terminal is located and a status of the terminal, and wherein the environment indicates whether the terminal is located in an indoor environment or an outdoor environment, and the status of the terminal indicates whether the terminal is in the idle status or a non-idle status.

* * * * *